(12) United States Patent
Williams et al.

(10) Patent No.: US 8,567,862 B2
(45) Date of Patent: Oct. 29, 2013

(54) CHILD SAFETY SEAT ASSEMBLY

(75) Inventors: Bruce L. Williams, Narvon, PA (US); Gregory S. Sellers, Christiana, PA (US); Curtis M. Hartenstine, Birdsboro, PA (US)

(73) Assignee: Wonderland Nurserygood Company Limited, Hong Kong (HK)

( * ) Notice: Subject to any disclaimer, the term of this patent is extended or adjusted under 35 U.S.C. 154(b) by 37 days.

(21) Appl. No.: 13/181,781

(22) Filed: Jul. 13, 2011

(65) Prior Publication Data

US 2012/0181822 A1 Jul. 19, 2012

Related U.S. Application Data

(60) Provisional application No. 61/461,410, filed on Jan. 18, 2011.

(51) Int. Cl.
*B60N 2/26* (2006.01)

(52) U.S. Cl.
USPC .................. 297/188.13; 297/256.16

(58) Field of Classification Search
USPC .............. 297/188.01, 188.13, 250.1, 256.16, 297/463.2
See application file for complete search history.

(56) References Cited

U.S. PATENT DOCUMENTS

| | | | |
|---|---|---|---|
| 4,743,063 A | 5/1988 | Foster, Jr. | |
| 4,915,446 A | 4/1990 | Darling et al. | |
| 4,943,113 A | 7/1990 | Meeker | |
| 5,052,750 A | 10/1991 | Takahashi et al. | |
| 5,385,387 A | 1/1995 | Kain | |
| 5,478,135 A * | 12/1995 | Kain | 297/256.16 |
| 5,494,331 A | 2/1996 | Onishi et al. | |
| 5,772,279 A | 6/1998 | Johnson, Jr. | |
| 6,017,088 A | 1/2000 | Stephens et al. | |
| 6,030,047 A | 2/2000 | Kain | |
| 6,070,890 A | 6/2000 | Haut et al. | |
| 6,367,875 B1 | 4/2002 | Babst | |
| 6,543,846 B2 * | 4/2003 | Cone | 297/250.1 |
| 6,863,345 B2 * | 3/2005 | Kain | 297/256.16 |
| 7,163,265 B2 * | 1/2007 | Adachi | 297/256.12 |
| 7,513,512 B2 | 4/2009 | Yoshie et al. | |
| 7,597,396 B2 * | 10/2009 | Longenecker et al. | 297/253 |
| 2004/0207241 A1 | 10/2004 | Sedlack | |
| 2007/0241596 A1 * | 10/2007 | Merrill | 297/250.1 |

FOREIGN PATENT DOCUMENTS

| | | |
|---|---|---|
| CN | 200948756 Y | 9/1997 |
| CN | 201124778 Y | 10/2008 |
| CN | 201151354 Y | 11/2008 |
| CN | 101670799 A | 3/2010 |
| EP | 609889 A1 | 4/1994 |
| EP | 631903 B1 | 10/1996 |
| EP | 0822115 A2 | 2/1998 |
| GB | 2202433 A | 9/1998 |

* cited by examiner

*Primary Examiner* — David Dunn
*Assistant Examiner* — Richard Lowry
(74) *Attorney, Agent, or Firm* — David I. Roche; Baker & McKenzie LLP

(57) ABSTRACT

A child safety seat assembly includes a base and a child seat. The base comprises a shell body, and a support platform provided at an upper side of the shell body on which the child seat can be installed. The shell body includes a first portion having a bottom adapted to provide stable resting support, and a second portion extending upward from the first portion, wherein the shell body includes a storage cavity accessible from an outer side of the second portion. The storage cavity can be sized to receive free end portions of a restrain strap used for holding the base in place.

16 Claims, 7 Drawing Sheets

CHILD SAFETY SEAT ASSEMBLY

CROSS-REFERENCE TO RELATED APPLICATION(S)

This application claims priority of U.S. provisional application No. 61/461,410 filed on Jan. 18, 2011.

BACKGROUND OF THE INVENTION

1. Field of the Invention

The present invention relates to child seat assemblies that include a child seat and a base.

2. Description of the Related Art

Conventionally, an automobile vehicle has seatbelts provided at the front and rear seats. The seatbelt generally includes shoulder and lap straps that may be fastened with an anchor point of the vehicle to restrain and protect the occupant in case of collision or sudden stop of the vehicle. However, the use of the vehicle seatbelt is not adapted for a young child who has a smaller body and may not be able to sustain the pressure applied by the seatbelt. Therefore, safety legislations require the use of a child safety seat for seating a young child in a vehicle. The seatbelt of the vehicle can be used to secure the child safety seat which has a harness more adapted to restrain the young child.

The child safety seat can include a child seat and a base connected underneath the child seat. To facilitate the use of the child seat, attachment structures may be provided to allow the child seat to attach with and removed from the base as desired. Moreover, a restrain strap can be disposed in a transverse direction through the base and attached with anchor points in the vehicle to securely hold the base on the vehicle seat. When the use of the base is not required, the restrain strap can be detached from the anchor points, and the base then can be removed from the vehicle seat. Once unfastened, the restrain strap may be stored separate from the base, or held with the base in a slack manner. However, the restrain strap may be inadvertently lost if it is kept separately. On the other hand, the conventional arrangement of the restrain strap with the base may not be convenient in use.

Therefore, there is a need for a child safety seat assembly that can address at least the foregoing issues.

SUMMARY

The present application describes a child safety seat assembly including a base and a child seat. In one embodiment, the base comprises a shell body, and a support platform provided at an upper side of the shell body on which a child seat can be installed. The shell body includes a first portion having a bottom adapted to provide stable resting support, and a second portion extending upward from the first portion, wherein the shell body includes a storage cavity accessible from an outer side of the second portion. The storage cavity can be sized to receive free end portions of a restrain strap used for holding the base in place.

At least one advantage of the structures described herein is the ability to provide a base that can conveniently store a restrain strap used for attaching the base. The base can include a storage cavity that is accessible from an outer side of the base, which allows convenient storage and retrieval of the restrain strap while the child seat remains installed on the base.

DETAILED DESCRIPTION OF THE EMBODIMENTS

Figure 1:
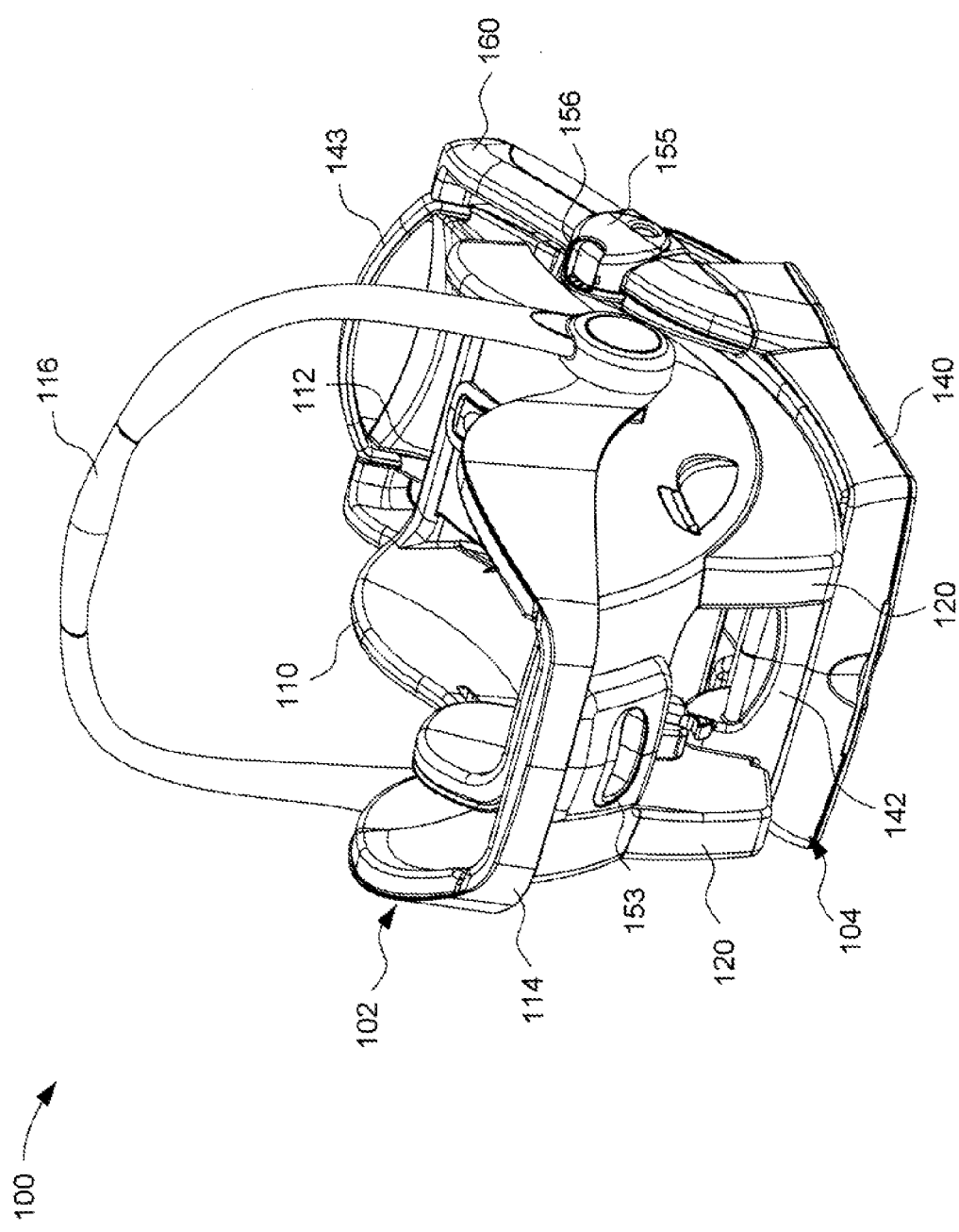
FIG. 1 is a perspective view illustrating an embodiment of a child safety seat assembly.

FIG. 1 is a perspective view illustrating an embodiment of a child safety seat assembly 100. The child safety seat assembly 100 includes a child seat 102 and a base 104. The child seat 102 can include a seat shell 110 having a seat portion 112 and a seatback 114. The seat shell 110, including the seat portion 112 and the seatback 114, can be formed in a single body by plastic molding. A handle 116 can be pivotally connected with two sides of the seat shell 110 to facilitate its carrying. In use, the child seat 102 can be either removed from the base 104, or attached therewith as shown in FIG. 1.

Figure 2:
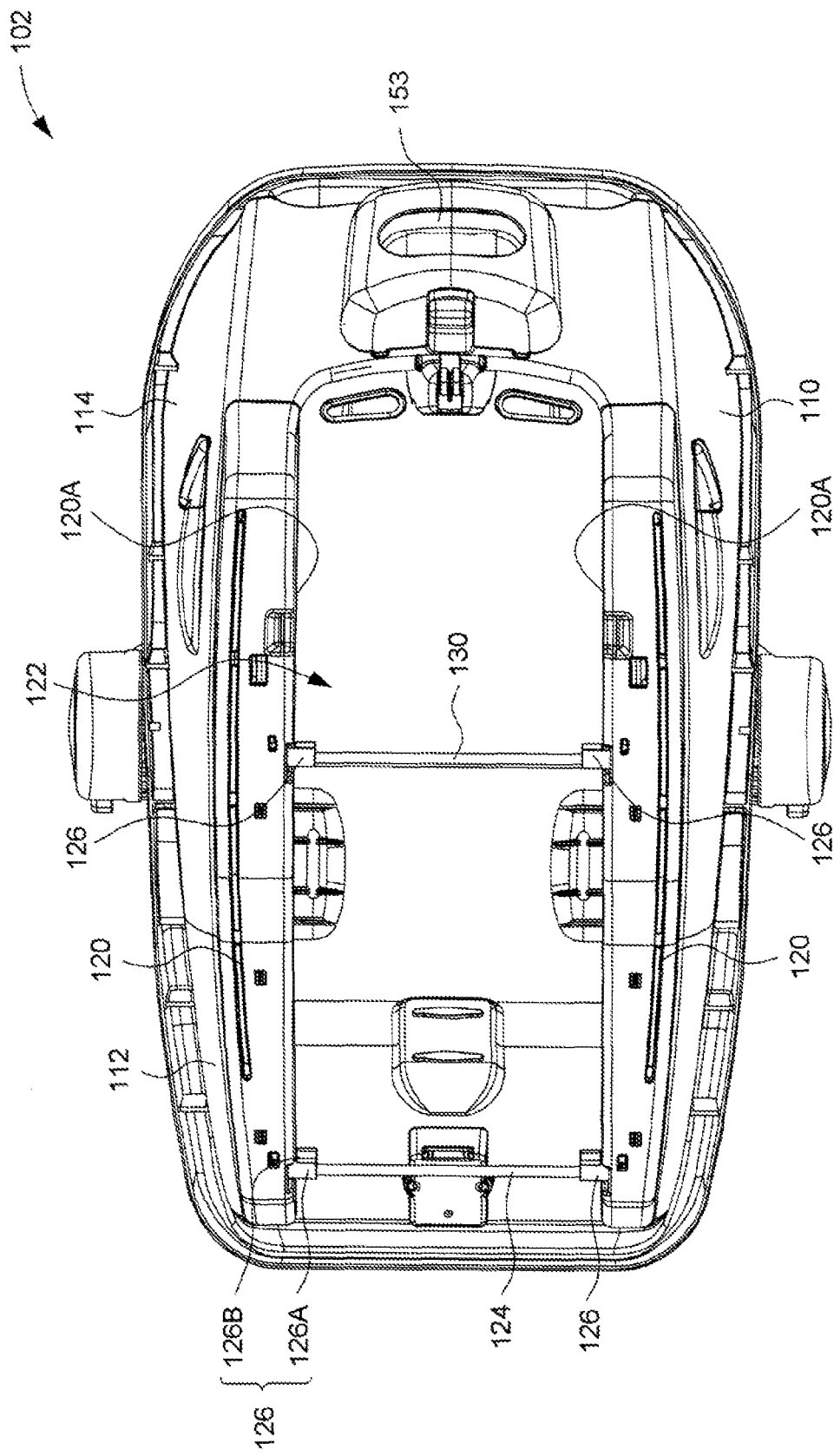
FIG. 2 is a bottom view of the child seat shown in FIG. 1.

FIG. 2 is a bottom view of the child seat 102. A bottom of the child seat 102 can include two protruding rails 120, and a central recessed region 122 delimited between the two rails 120. The rails 120 can be formed at the underside of the seat portion 112, and extend to the rear of the seatback 114. A first transverse shaft 124 can be pivotally mounted between the rails 120 across the recessed region 122 at a first position adjacent to a front of the child seat 102. Two latches 126 can be respectively provided at two opposite end portions of the first transverse shaft 124, adjacent to the opposite inner sidewalls 120A of the rails 120. Each of the latches 126 can be formed as a sleeve 126A that can be affixed around the transverse shaft 124 and to is provided with a radial engagement extension 126B oriented upward. A second transverse shaft 130 can be pivotally mounted between the rails 120 across the recessed region 122 at a second position behind the first transverse shaft 124. The second transverse shaft 130 is parallel to the first transverse shaft 124, and can have two opposite end portions mounted with latch elements 126 similar to those provided on the first transverse shaft 124. While the latches 126 have been described as parts assembled on the transverse shafts 124 and 130, alternate embodiments can also have the latches respectively formed integral with the first and second transverse shafts 124 and 130. The latches 126 exposed downward in the recessed region 122 can thereby form four attachment points disposed in two symmetrical pairs adjacent to the inner sidewalls 120A of the left and right side rails 120.

Figure 3:
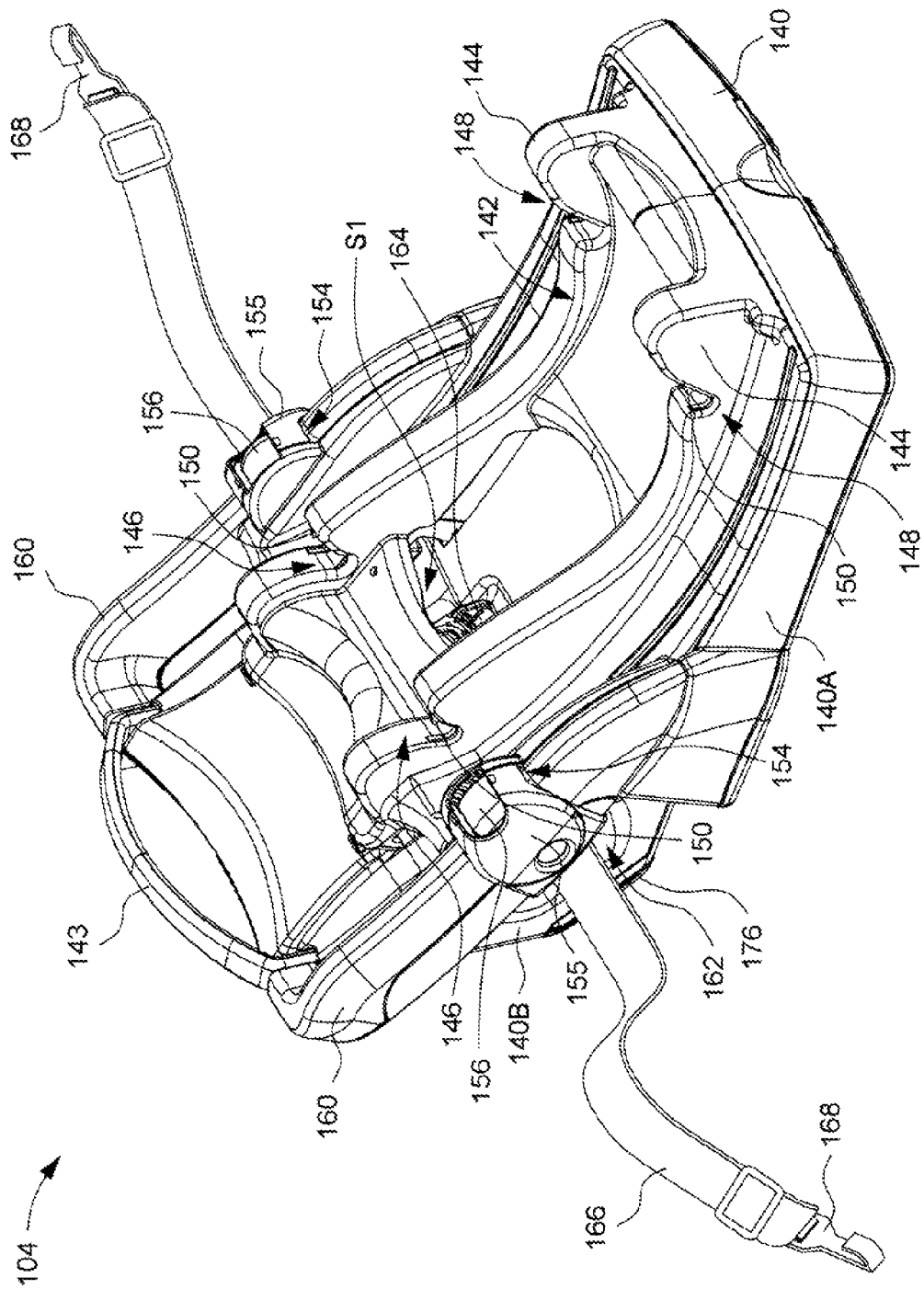
FIG. 3 is a schematic view of the base shown in FIG. 1.

FIG. 3 is a schematic view of the base 104. The base 104 can include a shell body 140, and a support platform 142 provided at an upper side of the shell body 140. The shell body 140 can have a first portion 140A having an enlarged bottom to provide stable resting support, and a second portion 140B extending upward at an angle from the first portion 140A. The second portion 140B can include an adjustable extension 143, which may be formed as a retractable plate. The adjustable extension 143 can be operable to retract inside the second portion 140B, or deploy outward to upwardly extend the length of the second portion 140B. When the child seat 102 is installed on the base 104, this adjustable extension 143 may be deployed to be conveniently used as footrest for the child.

The support platform 142 can include two protruding guide rails 144 that extend parallel in an axial direction of the base 104 and are adapted to receive the placement of the child seat 102. The guide rails 144 are symmetric in construction, including first grooves 146, and second grooves 148 axially spaced apart from the first grooves 146. The First and second grooves 146 and 148 can be formed as recesses from the upper surfaces of the guide rails 144, and are sized to receive and hold the end portions of the transverse shafts 124 and 130 provided with the latches 126. Moreover, each of the first and second grooves 146 and 148 can include catches 150 with which the latches 126 can engage to lock the child seat 102 with the support platform 142.

Figure 4:
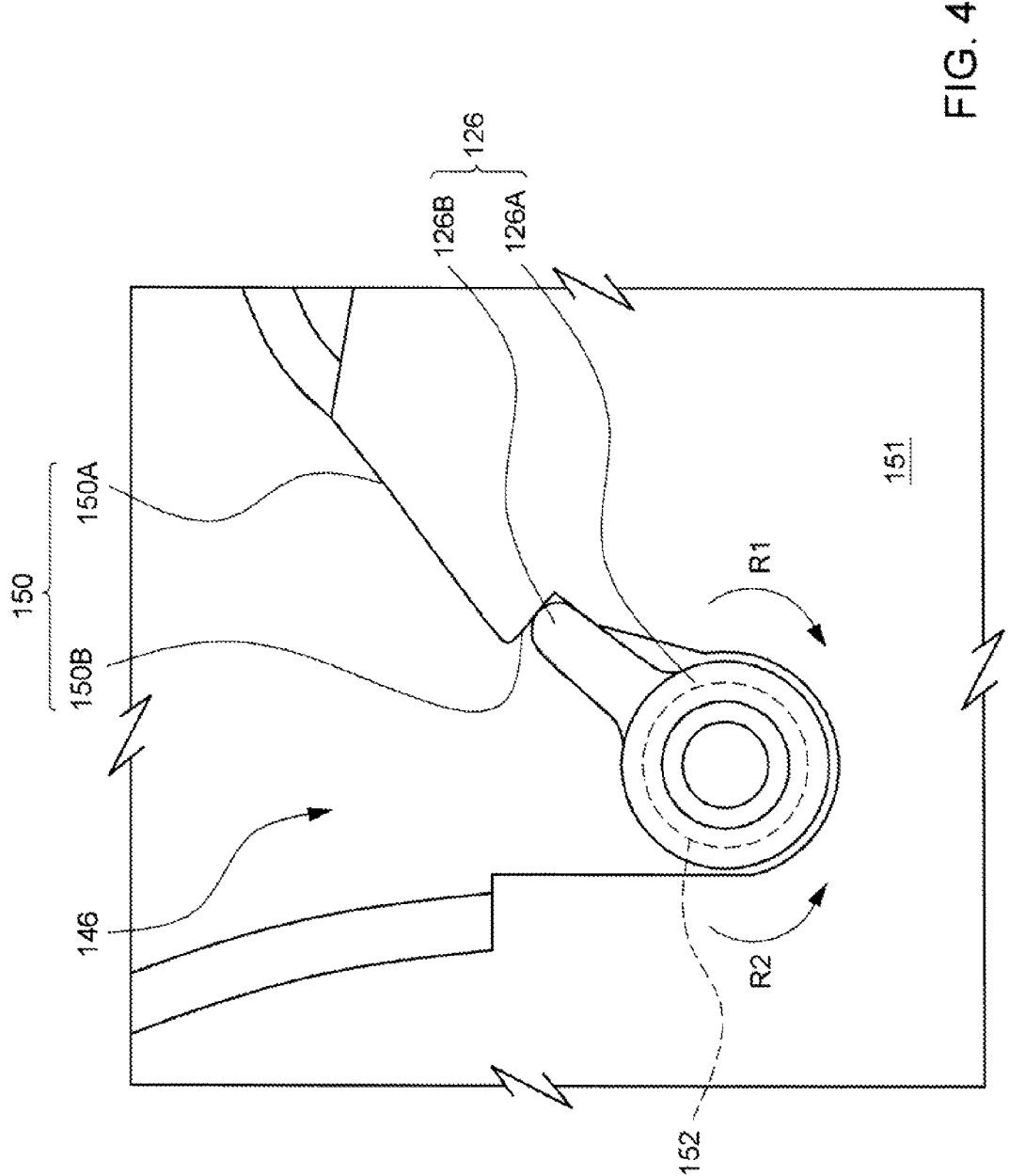
FIGS. 4 and 5 are enlarged views illustrating how a plurality of latches provided on the child seat respectively engage with catches provided on an adjustable platform of the base.
Figure 5:
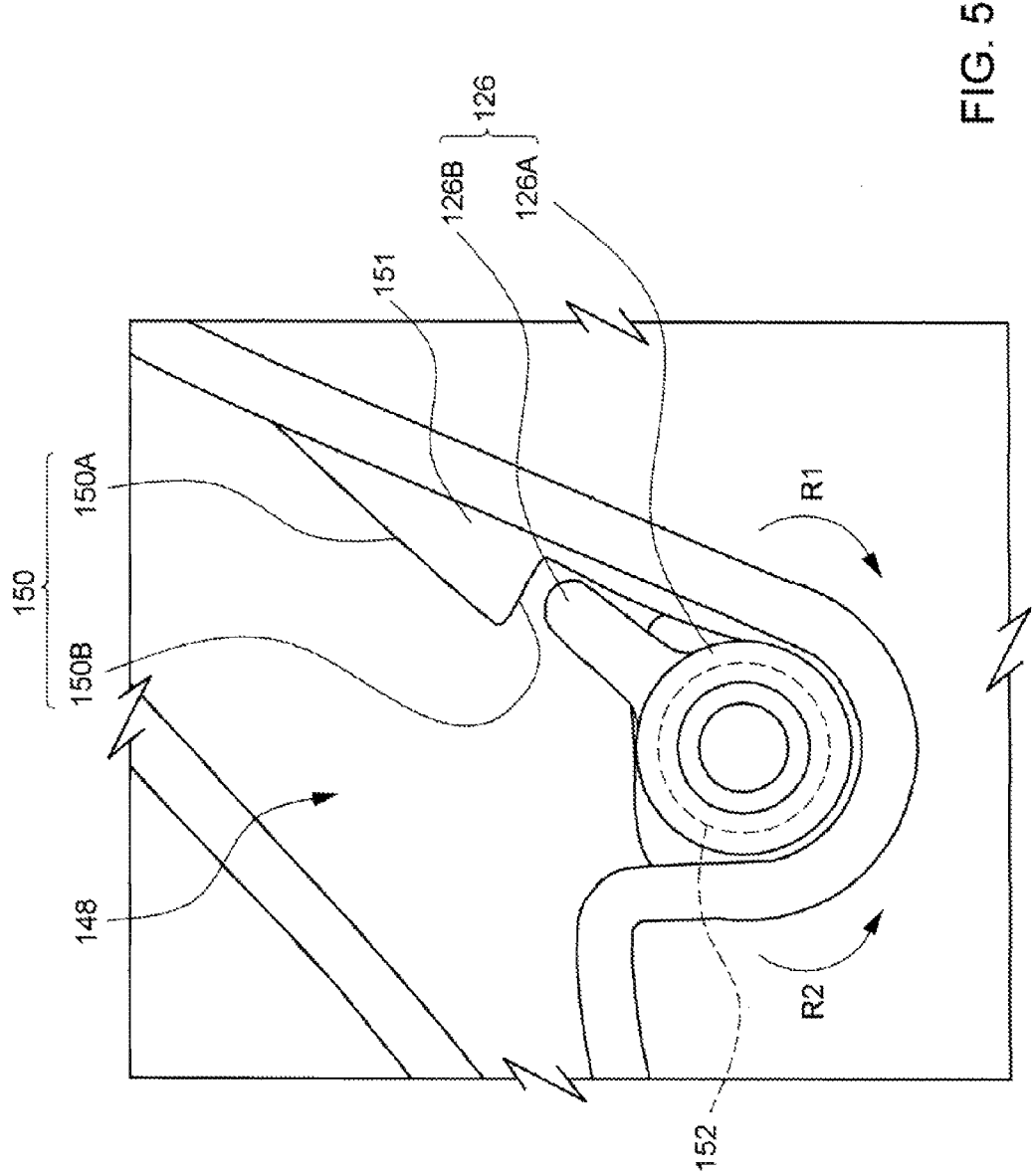

FIGS. 4 and 5 are enlarged views illustrating how the latches 126 of the child seat 102 can respectively engage with the catches 150 in the first and second grooves 146 and 148 of the support platform 142. Each of the catches 150 can be formed on a holder plate 151 having a hook shape comprised of an upper angled surface 150A and a lower surface 150B. When the child seat 102 is disposed on the support platform 142, the angled surface 150A can respectively push away the engagement extension 126B so that each of the latches 126 can be received in the associated first and second grooves 146 and 148. Once each latch 126 is held in the associated groove, forward and backward movements as well as lateral displacements of the child seat 102 relative to the base 104 can be blocked. A torsion spring 152 mounted with the latch 126 (shown with phantom lines) can then bias the latch 126 to rotate about the transverse axis defined by the transverse shaft 130 in a first direction R1 to place the engagement extension 126B in locking engagement against the lower surface 150B of the catch 150, whereby upward removal of the child seat 102 is also blocked. The child seat 102 can be thereby locked in position with the base 104. To unlock the child seat 102, a release button 153 (better shown in FIGS. 1 and 2) can be operated to drive rotation of the latches 126 in the direction R2 to disengage the engagement extensions 126B from the lower surface 150B of the catches 150. The child seat 102 then can be upwardly removed from the base 104.

Referring again to FIG. 3, in one embodiment, the support platform 142 can also be movably assembled with the shell body 140. When the child seat 102 is installed on the support platform 142, the support platform 142 can be adjusted rearward or forward to modify the axial position of the child seat 102 on the base 104 according to the child's needs. For this purpose, the shell body 140 can include two elongated arms 160 that extend lengthwise symmetrically at the left and right sides of the second portion 140B. Left and right sides of the support platform 142 can be provided with two sockets 155 that include guide slots 154 through which the arms 160 are respectively mounted. The sockets 155 can be movable along the arms 160 as the adjustable platform 142 is adjusted back and forth relative to the shell body 140. In addition, each of the sockets 155 can be provided with a release button 156 that is connected with a latch mechanism operable to securely hold the adjustable platform 142 at multiple positions. Either of the two release buttons 156 can be operated to unlock the support platform 142 and permit its adjustment relative to the shell body 140.

Referring again to FIGS. 1 and 3, the base 104 can include a transverse channel 162 that extends along a width of the base 104 and is provided adjacent to an inner side S1 of the second portion 140B. The transverse channel 162 can have a lower surface delimited by the shell body 140, and extend from the left to the right below the arms 160 and the support platform 142. A central region of the transverse channel 162 can include a clamp device 164 mounted on an upper surface of the shell body 140. When the base 104 is installed on a vehicle seat, a restrain strap 166 can pass along the transverse channel 162 from the left to right side, and attached with the clamp device 164. Opposite free end portions of the restrain strap 166 provided with latch elements 168 (such as hook latches) can then attach with fixed positions in the vehicle to hold the base 104 in place. When the restrain strap 166 is not used, the latch elements 168 may be detached, and the restrain strap 166 may be disposed in a storage cavity provided in the base 104.

Figure 6:
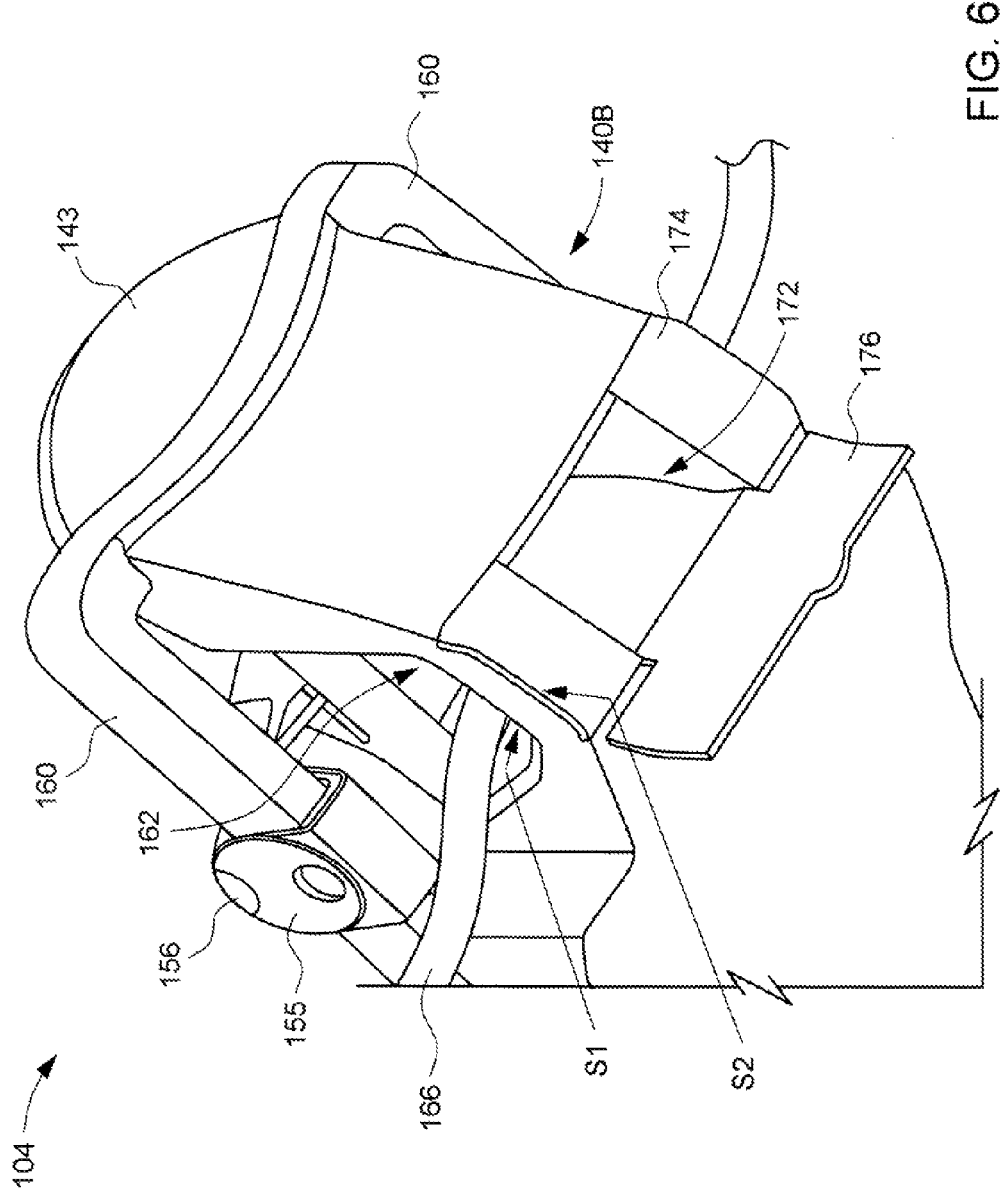
FIGS. 6 and 7 are schematic views illustrating one embodiment of a storage cavity provided in the base.
Figure 7:
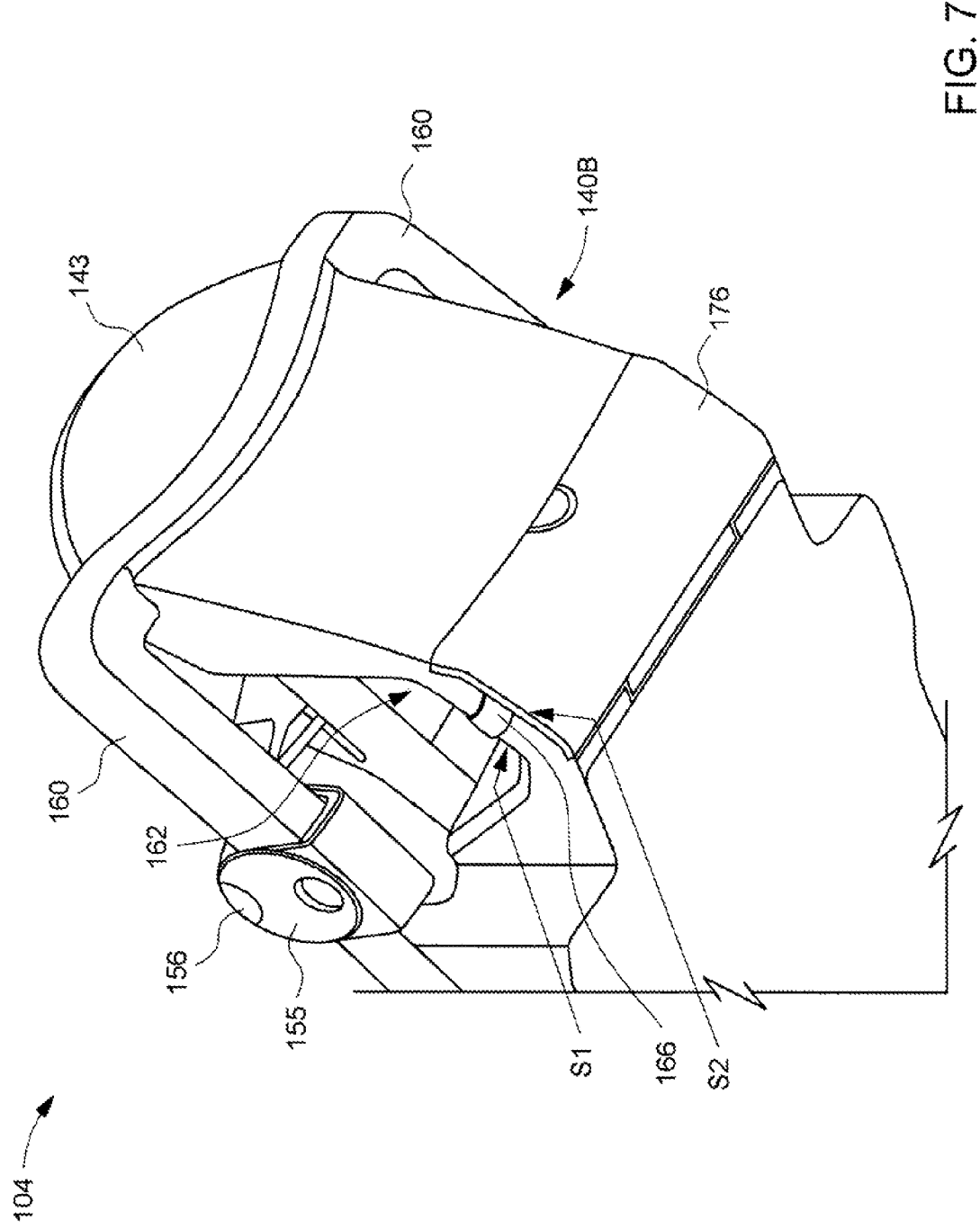

FIGS. 6 and 7 are schematic views illustrating one embodiment of a storage cavity 172 provided in the base 104. The second portion 140B of the shell body 140 can have an outer surface 174 that is located at a side opposite to the transverse channel 162. The storage cavity 172 can be arranged in the second portion 140B of the shell body 140, and opened on the outer surface 174 of the second portion 140B. In particular, the storage cavity 172 can be opened and accessible at a lower region of the outer surface 174 underneath the transverse channel 162. In this manner, the access opening of the storage cavity 172 is at a side opposite to the transverse channel 162, and the storage cavity 172 does not communicate with the transverse channel 162. The storage cavity 172 can be closed by a cover 176, which can be exemplary a movable flap assembled with the shell body 140. In one embodiment, the movable cover 176 can be pivotally connected with the second portion 140B of the shell body 140.

When it is unused, the restrain strap 166 can be wrapped around the second portion 140B from the inner side S1 to the outer side S2 of the second portion 140B (as shown in FIG. 7), and the latch elements 168 at the distal ends of the restrain strap 166 can be placed in the storage cavity 172. The cover 176 then can be rotated to close the storage cavity 172 containing the latch elements 168, while the restrain strap 166 is allowed to extend outside the storage cavity 172. In this configuration, a middle portion of the restrain strap 166 can be held in the transverse channel 162 via the clamp device 164, whereas the two free end portions of the restrain strap 166 provided with the latch elements 168 can be held in the storage cavity 172 at the underside of the transverse channel 162. This construction allows to store the unused restrain strap 166 in a convenient manner without the need of removing the child seat 102, which can remain installed on the base 104.

In case the restrain strap 166 is needed for use, the cover 176 can be opened, and the latch elements 168 can be then retrieved from the storage cavity 172. Again, the position of the storage cavity 172 allows convenient access from the outer side of the shell body 140, and the restrain strap 166 can be retrieved while the child seat 102 remains installed on the base 104.

It is worth noting that alternate embodiments may also have the storage cavity 172 sized to permit the storage of the entire restrain strap 166 with the latch elements 168. In this case, the restrain strap 166 first has to be detached from the clamp device 164 and removed from the channel 162. Then the entire restrain strap 166 with the latch elements 168 can be placed in the storage cavity 172.

At least one advantage of the structures described above is the ability to provide a base suitable for use with a child seat that can conveniently store a restrain strap used for attaching the base. The base can include a storage cavity that is accessible from an outer side of the base, which allows convenient storage and retrieval of the restrain strap while the child seat remains installed on the base.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A base suitable for use with a child seat, comprising:
   a shell body, including a first portion having a bottom surface adapted to provide stable resting support, and a second portion extending upward from the first portion and having a first and a second surface opposite to each other, wherein the second portion includes a transverse channel extending along the first surface for passage of a restrain strap, and a storage cavity arranged adjacently below a middle region of the transverse channel and having an opening that is formed on the second surface of the second portion at a location near the bottom surface, wherein the opening of the storage cavity is closed by a moveable cover; and
   a support platform provided at an upper side of the shell body and adapted to receive the placement of a child seat.

2. The base according to claim 1, wherein the storage cavity is sized to receive a free end portion of the restrain strap that is used for attaching the base.

3. The base according to claim 1, wherein the storage cavity is accessible from an underside of the transverse channel.

4. The base according to claim 1, wherein the transverse channel passes below a portion of the support platform.

5. The base according to claim 1, wherein the transverse channel includes a clamp device adapted to attach with the restrain strap.

6. A child safety seat assembly comprising:
   the base according to claim 1; and
   a child seat installed on the base.

7. A base suitable for use with a child seat, comprising:
   a shell body having a bottom surface adapted to provide stable resting support, an outer surface connected with the bottom surface and extending upward from the bottom surface, a transverse channel, and two side edge portions contiguous to two opposite ends of the transverse channel;
   a support platform provided at an upper side of the shell body and adapted to receive the placement of a child seat; and
   a restrain strap having two free end portions provided with latch elements, wherein the restrain strap is mounted on the shell body;
   wherein the shell body includes a storage cavity that is sized to receive the latch elements and has an opening formed on the outer surface at a location near the bottom surface, further comprising a moveable cover adapted to close the storage cavity while the latch elements are received therein, and when the latch elements are stored in the storage cavity, the restrain strap extends substantially along the transverse channel and wraps around the two side edge portions of the shell body.

8. The base according to claim 7, wherein the shell body includes a first portion having a bottom adapted to provide stable resting support, and a second portion extending upward from the first portion and including the storage cavity.

9. The base according to claim 8, wherein the restrain strap is attached with the base at an inner side of the second portion, and wraps around the second portion from the inner side to an outer side of the second portion so as to place the latch elements in the storage cavity.

10. The base according to claim 9, wherein the transverse channel is formed below the support platform and at the inner side of the second portion.

11. The base according to claim 10, wherein the storage cavity is accessible from an underside of the transverse channel.

12. The base according to claim 7, wherein the transverse channel includes a clamp device that attaches with the restrain strap.

13. A child safety seat assembly comprising:
   the base according to claim 7; and
   a child seat installed on the base.

14. A base suitable for use with a child seat, comprising:
   a shell body having a bottom surface adapted to provide stable resting support, and a portion delimited between two opposite first and second surfaces of the shell body, the shell body including a transverse channel that is located adjacent to the first surface and is adapted to receive a restrain strap used for holding the base in place, and the portion of the shell body located between the first and second surfaces including a storage cavity that opens on the second surface at a location near the bottom surface further including a moveable cover operable to close the storage cavity; and
   a support platform provided at an upper side of the shell body and adapted to receive the placement of a child seat;
   wherein the storage cavity is capable of storing at least one free end portion of the restrain strap.

15. The base according to claim 14, wherein when the restrain strap is installed with the base and the free end portion is placed in the storage cavity, the restrain strap extends along the transverse channel and wraps around a side edge of the shell body that is contiguous to an end of the transverse channel.

16. The base according to claim 14, wherein the storage cavity is located adjacently below a middle region of the transverse channel, and is accessible from an underside of the transverse channel.

* * * * *